United States Patent
Kobler et al.

(10) Patent No.: US 7,748,752 B2
(45) Date of Patent: Jul. 6, 2010

(54) PIPE CONNECTING DEVICE

(75) Inventors: Matthias Kobler, Blaustein (DE);
Roland Höfle, Friedrichshafen (DE)

(73) Assignee: Airbus Deutschland GmbH, Hamburg (DE)

( * ) Notice: Subject to any disclaimer, the term of this patent is extended or adjusted under 35 U.S.C. 154(b) by 50 days.

(21) Appl. No.: 12/052,244

(22) Filed: Mar. 20, 2008

(65) Prior Publication Data
US 2008/0231047 A1 Sep. 25, 2008

Related U.S. Application Data

(60) Provisional application No. 60/896,535, filed on Mar. 23, 2007.

(30) Foreign Application Priority Data
Mar. 23, 2007 (DE) ........................ 10 2007 014 003

(51) Int. Cl.
*F16L 21/02* (2006.01)
(52) U.S. Cl. .................. 285/371; 285/369; 285/231
(58) Field of Classification Search ................. 285/331, 285/371, 369, 417, 231, 233
See application file for complete search history.

(56) References Cited

U.S. PATENT DOCUMENTS

| | | | | | |
|---|---|---|---|---|---|
| 344,760 | A | * | 6/1886 | Wilbur | 285/296.1 |
| 1,821,328 | A | * | 9/1931 | Segelhorst | 285/148.19 |
| 1,921,642 | A | * | 8/1933 | Stephenson | 285/331 |
| 2,349,016 | A | * | 5/1944 | Stephens | 285/223 |
| 3,458,920 | A | * | 8/1969 | Crump | 29/458 |
| 3,686,747 | A | * | 8/1972 | Bagnulo | 29/508 |
| 3,796,057 | A | * | 3/1974 | Dougherty | 405/251 |
| 4,400,019 | A | * | 8/1983 | Fruck | 285/55 |
| 4,632,435 | A | * | 12/1986 | Polyak | 285/243 |
| 4,819,972 | A | * | 4/1989 | Champa et al. | 285/331 |
| 4,941,693 | A | * | 7/1990 | Spaude et al. | 285/331 |
| 5,213,374 | A | * | 5/1993 | Keating | 285/23 |
| 5,277,457 | A | * | 1/1994 | Hayashi | 285/331 |
| 5,362,112 | A | * | 11/1994 | Hamilton et al. | 285/110 |
| 5,505,497 | A | * | 4/1996 | Shea et al. | 285/55 |
| 5,709,411 | A | * | 1/1998 | Bank et al. | 285/110 |

(Continued)

FOREIGN PATENT DOCUMENTS

DE     1860425     10/1962

(Continued)

*Primary Examiner*—David E Bochna
(74) *Attorney, Agent, or Firm*—Wood, Herron & Evans, L.L.P.

(57) ABSTRACT

A pipe connecting device (10) for connecting two pipeline portions (12, 14) of an aircraft pipeline system comprises a bridge portion (16), the cross-sectional form of which is matched to a cross-sectional form of the pipeline portions (12, 14) that are to be connected to each other. The pipe connecting device (10) further comprises a first receiving portion (18), which is constituted by two limbs (20, 22) extending from the bridge portion (16) in a first direction, and which is adapted to receive an edge portion (38) of a first pipeline portion (12) of the aircraft pipeline system, and a second receiving portion (24), which is constituted by two limbs (26, 28) extending from the bridge portion (16) in a second direction opposite to the first direction, and which is adapted to receive an edge portion (40) of a second pipeline portion (14) of the aircraft pipeline system.

19 Claims, 3 Drawing Sheets

U.S. PATENT DOCUMENTS

| | | | | |
|---|---|---|---|---|
| 5,730,474 | A | * | 3/1998 | Bank .......................... 285/110 |
| 5,851,036 | A | * | 12/1998 | Vanesky .................. 285/294.1 |
| 6,070,912 | A | * | 6/2000 | Latham ....................... 285/61 |
| 6,113,158 | A | * | 9/2000 | Bocchicchio et al. ....... 285/331 |
| 7,011,345 | B2 | * | 3/2006 | Foos .......................... 285/374 |

FOREIGN PATENT DOCUMENTS

| | | |
|---|---|---|
| DE | 1965422 | 7/1970 |
| DE | 1937176 | 2/1971 |
| DE | 2449753 | 4/1976 |
| DE | 19718282 | 11/1998 |
| DE | 102004021934 | 12/2005 |
| EP | 366637 | 5/1990 |
| EP | 390748 | 10/1990 |
| EP | 774611 | 5/1997 |
| FR | 2206828 | 6/1974 |

* cited by examiner

PIPE CONNECTING DEVICE

FIELD OF THE INVENTION

The invention relates to a pipe connecting device for connecting two pipeline portions of an aircraft pipeline system. Furthermore, the invention relates to an aircraft pipeline system having at least one such pipe connecting device.

BACKGROUND OF THE INVENTION

A pipeline system provided on-board an aircraft, such as, for example, the pipeline system of an aircraft air-conditioning system, normally consists of a multiplicity of individual pipeline portions, the ends of which must be connected to each other in a sealing manner when the pipeline system is being assembled in the aircraft. Sleeves composed of rubber are normally used to connect pipeline portions having a round or an oval cross-section, which sleeves are fastened by means of pipe clamps to the two ends of the pipeline portions that are to be connected to each other. The connection of two flat channel portions, by contrast, is effected by means of flange elements, which are fitted onto the two ends of the flat channel portions that are to be connected to each other, and are fixedly connected to the flat channel portions by laminating. Finally, a groove formed between an outer face of the flat channel portions and an inner face of the flange elements serves to receive a connecting element, which allows the two flat channel portions to be connected in a sealing manner. These two known arrangements for producing a connection between two pipeline portions have the disadvantage that their assembly is relatively complex, and therefore expensive.

SUMMARY OF THE INVENTION

The present invention is directed to providing a pipe connecting device which enables two pipeline portions of an aircraft pipeline system to be reliably connected to each other in a rapid and simple manner and to simplify mounting a flow control device, which controls fluid flow through the pipeline portions, to the pipeline portions.

For the purpose of achieving this object, a pipe connecting device according to the invention for connecting two pipeline portions of an aircraft pipeline system comprises a bridge portion, the cross-sectional form of which is matched to a cross-sectional form of the pipeline portions that are to be connected to each other. If the pipe connecting device is intended for connecting pipeline portions with a round cross-section, the bride portion is realized, for example, in the form of a circular ring. The cross-sectional form of the bridge portion can, however, also be matched to an oval pipe cross-section or to a flat channel cross-section. Moreover, the pipe connecting device comprises a first receiving portion, which is constituted by two limbs extending from the bridge portion in a first direction, and which is adapted to receive an edge portion of a first pipeline portion of the aircraft pipeline system. Finally, the pipe connecting device is provided with a second receiving portion, which is constituted by two limbs extending from the bridge portion in a second direction opposite to the first direction, and which is adapted to receive an edge portion of a second pipeline portion. An inner circumference of the pipe connecting device is adapted to mount a flow control device. According to one embodiment, a groove may be provided on the inner circumference of the pipe connecting device to mount the flow control device. According to another embodiment, a snap-fit connection (incorporating e.g. one or more latching protrusions) may serve to mount the flow control device. In more general terms, a fastening device is arranged at the inner circumference of the pipe connecting device to mount the flow control device. The flow control device is preferably an orifice plate.

For the purpose of connecting the two pipeline portions of the aircraft pipeline system with the use of the pipe connecting device according to the invention, the pipe connecting device is first fitted onto the edge portion of the first pipeline portion in such a way that the edge portion of the first pipeline portion is received in the first receiving portion of the pipe connecting device. The edge portion of the second pipeline portion is then pushed into the second receiving portion of the pipe connecting device. The ends of two pipeline portions of a pipeline system provided on-board an aircraft can thus be securely connected to each other in a rapid manner by means of the pipe connecting device according to the invention. Moreover, the structure of the pipe connecting device according to the invention renders possible simple plug-in assembly, wherein it is generally even possible to dispense with the use of tools. Moreover, since, through simple matching of the cross-sectional form of the bridge portion, the pipe connecting device can be matched to any pipe cross-sections of the pipeline portions that are to be connected to each other, it can be used in a particularly flexible manner. Finally, the pipe connecting device according to the invention renders possible a significant reduction in the number of single parts to be assembled, in comparison with known pipe connecting arrangements.

The bridge portion, the first receiving portion and the second receiving portion of the pipe connecting device according to the invention are preferably formed as a single piece, and may be composed, for example, of an amorphous thermoplastic polyetherimide material marketed under the trade name ULTEM® or of a polycarbonate material marketed under the trade name LEXAN®. The component can then be produced inexpensively as an injection moulded part and, moreover, it has the combustibility resistance necessary for use in aircraft construction.

A preferred embodiment of the pipe connecting device according to the invention comprises a first sealing element. The first sealing element can be received in the first receiving portion of the pipe connecting device, when the pipe connecting device is connected to the first pipeline portion, such that an outer face of the first sealing element cooperates in a sealing manner with inner faces of the limbs constituting the first receiving portion. The first sealing element thereby provides for a sealing connection of the first pipeline portion to the pipe connecting device.

Furthermore, the pipe connecting device according to the invention may comprise a second sealing element. The second sealing element can be received in the second receiving portion of the pipe connecting device, when the pipe connecting device is connected to the second pipeline portion, such that an outer face of the second sealing element cooperates in a sealing manner with inner faces of the limbs constituting the second receiving portion. The second sealing element thereby provides for a sealing connection of the second pipeline portion to the pipe connecting device.

A cross-sectional form of the first and/or of the second sealing element is preferably matched to the cross-sectional form of the pipeline portions that are to be connected to each other. For example, the first and/or the second sealing element may have a cross-section in the form of a circular ring, if the two pipeline portions that are to be connected to each other have a round cross-section. As an alternative thereto, however, the first and/or the second sealing element may also have an oval cross-sectional form or a cross-sectional form matched to a flat channel cross-section.

Preferably, a groove, for receiving the edge portion of the first and/or of the second pipeline portion, is formed in the first and/or the second sealing element. Upon connecting the first and second pipeline portions with the use of the pipe connecting device according to the invention, the first sealing element can then be first fitted onto the edge portion of the first pipeline portion in a rapid and convenient manner. The pipe connecting device can then be pushed over that edge portion of the first pipeline portion which has already been connected to the first sealing element, until the first sealing element and the edge portion of the first pipeline portion are securely received in the first receiving portion of the pipe connecting device. Similarly, the second sealing element can be fitted onto the edge portion of the second pipeline portion, before the edge portion of the second pipeline portion, with the second sealing element fastened thereto, is pushed into the second receiving portion of the pipe connecting device.

Use of the first and second sealing elements renders possible the production of a highly tight pipe connection. The dimensions of the first and second sealing elements are preferably so selected that the first and second sealing elements do not completely fill the first and second receiving portions of the pipe connecting device. Rather, the first and second sealing elements are preferably so formed that a certain clearance is present between the bridge portion of the pipe connecting device and the sealing elements received in the receiving portions of the pipe connecting device. A further advantage of the first and second sealing elements consists in that they are able to equalize production tolerances of the pipe connecting device and of the edge portions of the first and second pipeline portions that are to be connected to each other, and still provide for a secure sealing connection of the first and second pipeline portions to the pipe connecting device even when these components have certain form tolerances.

At least one securing projection, which narrows a cross-section of the first receiving portion, is preferably formed in the region of the first receiving portion of the pipe connecting device. In a preferred embodiment of the pipe connecting device according to the invention, two mutually opposing securing projections, which narrow a cross-section of the first receiving portion, are provided in the region of the first receiving portion. Similarly, at least one securing projection, which narrows a cross-section of the second receiving portion, can be formed in the region of the second receiving portion. Preferably, however, two mutually opposing securing projections, which narrow a cross-section of the second receiving portion, are also provided in the region of the second receiving portion. Slippage of the first and second sealing element out of the first and second receiving portions of the pipe connecting device is countered by the securing projections.

The pipe connecting device according to the invention can further comprise a first extension portion, which adjoins the first receiving portion and is constituted by an elongation of the two limbs constituting the first receiving portion. A second extension portion adjoining the second receiving portion of the pipe connecting device can be constituted by an elongation of the two limbs constituting the second receiving portion. The pipe connecting device according to the invention can be realized entirely without extension portions, or with only one extension portion. The pipe connecting device then has the distinction of a particularly low weight. However, for the sealing element received in the receiving portion that adjoins the extension portion, the extension portion affords particularly good protection against environmental influences. The design of the pipe connecting device according to the invention without extension portions, with only one extension portion or with two extension portions can therefore be adapted for each specific application, for example in dependence on the ambient conditions and the mechanical demands upon the pipe connecting device.

The pipe connecting device according to the invention preferably further has a vent bore, which connects an outer circumference of the pipe connecting device to an interior of the first and/or of the second receiving portion. For example, a first vent bore can establish a connection between the outer circumference of the pipe connecting device and the interior of the first receiving portion, which interior is constituted between the limbs of the first receiving portion. Similarly, a second vent bore can establish a connection between the outer circumference of the pipe connecting device and the interior of the second receiving portion, which interior is constituted between the limbs of the second receiving portion. Preferably, however, there is only one vent bore, which extends in the region of the bridge portion of the pipe connecting device and thereby connects both the first and the second receiving portion of the pipe connecting device to the outer circumference of the pipe connecting device. The vent bore has the function of allowing the air that is enclosed between the receiving portions of the pipe connecting device and the sealing elements to escape. Moreover, the vent bore prevents the creation of a resistance caused by a vacuum in disassembly of the pipe connecting device.

In a preferred embodiment of the pipe connecting device according to the invention, a groove, for receiving a fastening device, is formed on an outer circumference of the pipe connecting device. The groove can be formed as a full-circumference groove, and be adapted to receive a clamp fastener. The connection point, created by the pipe connecting device according to the invention, between the first and the second pipeline portion can thus be used simultaneously as a fastening point.

In a particularly preferred embodiment of the pipe connecting device according to the invention, a further groove is formed on an inner circumference of the pipe connecting device, which preferably extends around the full inner circumference of the pipe connecting device. This further groove serves to receive a flow control device for controlling the volume flow of fluid flowing through the first and second pipeline portions. A pipe connecting device having a flow control device receiving groove renders possible rapid and simple fitting of the flow control device, and can therefore be used in a particularly advantageous manner in a pipeline system of an aircraft air-conditioning system in which a multiplicity of flow control devices are required for controlling the volume flows of fluid flowing through the pipeline system.

The pipe connecting device according to the invention preferably further comprises a flow control device, which has at least one latching flange with a projection formed on the latching flange. This projection is preferably adapted to latch, in the fitting of the flow control device, into the further groove formed on the inner circumference of the pipe connecting device.

An aircraft pipeline system according to the invention, for example a pipeline system of an aircraft air-conditioning system, comprises at least one pipe connecting device, according to the invention, described above.

BRIEF DESCRIPTION OF THE DRAWINGS

Preferred exemplary embodiments of the pipe connecting device according to the invention are now explained more in detail with reference to the appended schematic drawings, of which

DETAILED DESCRIPTION

Figure 1:
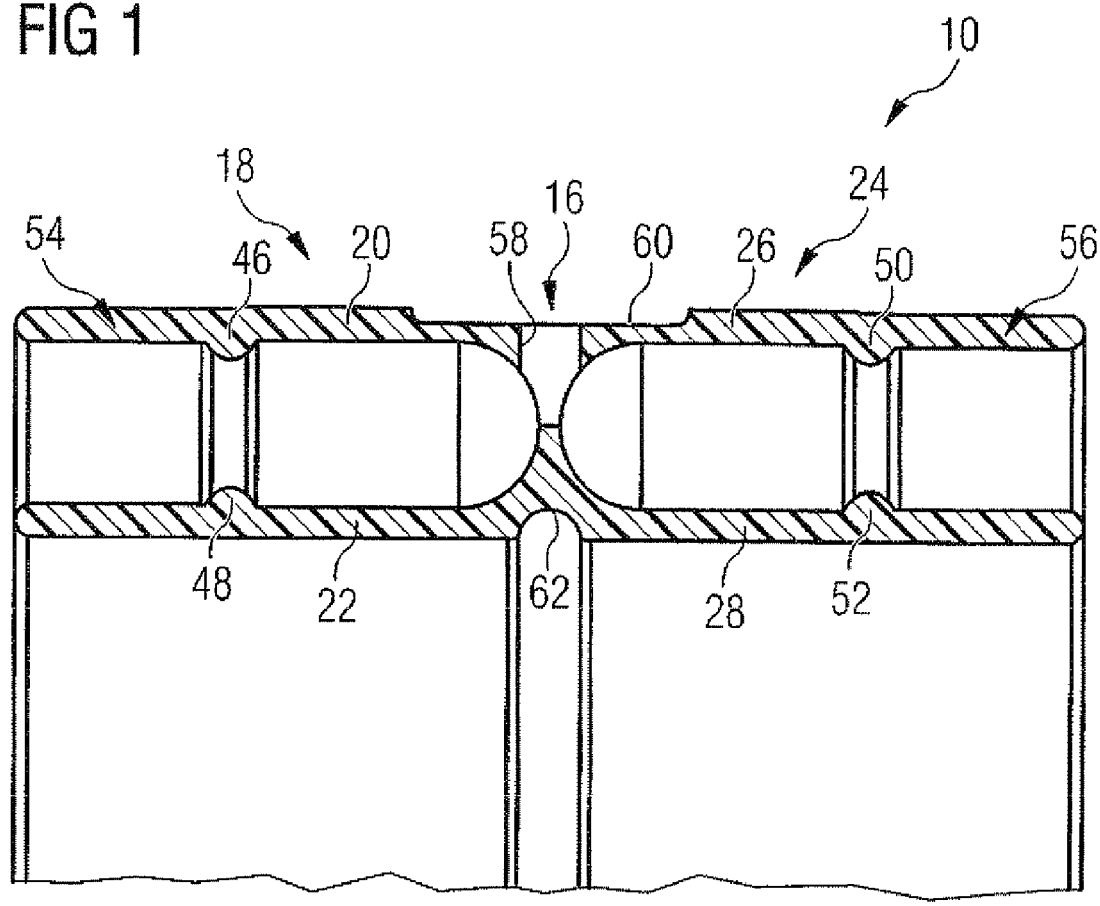
FIG. 1 shows, in longitudinal section, a first embodiment of a pipe connecting device according to the invention.
Figure 2:
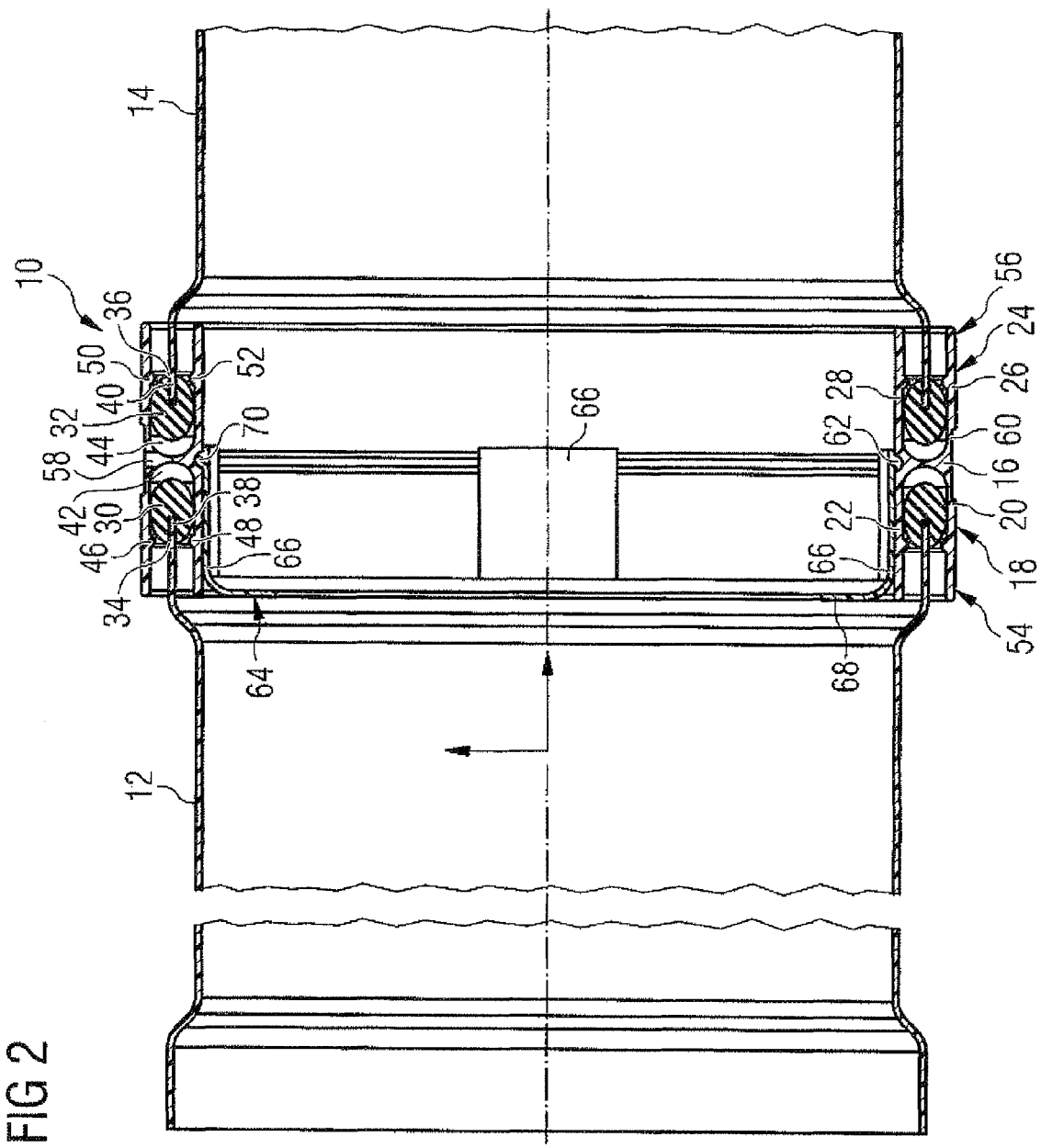
FIG. 2 shows, in longitudinal section, the pipe connecting device represented in FIG. 1, the device being connected to first and second pipeline portions and to a flow control device.

A pipe connecting device 10, shown in FIGS. 1 and 2, for connecting a first and a second pipeline portion 12, 14 of a pipeline system of an aircraft air-conditioning system, comprises a bridge portion 16. The bridge portion 16 has a cross-section in the form of a circular ring, and is thus matched to the round cross-section of the first and second pipeline portions 12, 14. The pipe connecting device 10 furthermore comprises a first receiving portion 18, which is constituted by two limbs 20, 22 extending substantially in parallel to each other from the bridge portion 16 in a first direction. Finally, there is a second receiving portion 24, which likewise is constituted by two limbs 26, 28 arranged substantially in parallel to each other, the limbs 26, 28 extending from the bridge portion 16 in a second direction opposite to the first direction. The bridge portion 16, the first receiving portion 18 and the second receiving portion 24 of the pipe connecting device 10 are formed as a single piece, as an injection molded part, and are composed of an amorphous thermoplastic polyetherimide material marketed under the trade name ULTEM®.

The pipe connecting device 10 furthermore comprises a first sealing element 30 and a second sealing element 32 (see FIG. 2). The first and second sealing elements 30, 32 have a cross-section in the form of a circular ring. The cross-sectional form of the first and second sealing elements 30, 32 is thus matched, as is the cross-sectional form of the bridge portion 16, to the round cross-sectional form of the two pipeline portions 12, 14 that are to be connected to each other. A groove 34 is formed in the first sealing element 30, which is adapted to receive an edge portion 38 of the first pipeline portion 12. Similarly, a groove 36 is formed in the second sealing element 32, which is adapted to receive an edge portion 40 of the second pipeline portion 14.

When, as shown in FIG. 2, the first and second pipeline portions 12, 14 are connected to the pipe connecting device 10, the edge portion 38 of the first pipeline portion 12 is received, with the first sealing element 30, in the first receiving portion 18 of the pipe connecting device 10, wherein an outer face of the first sealing element 30 cooperates in a sealing manner with two mutually opposing inner faces of the limbs 20, 22 constituting the first receiving portion 18. On the other hand, the edge portion 40 of the second pipeline portion 14 is received, with the second sealing element 32, in the second receiving portion 24 of the pipe connecting device, wherein an outer face of the second sealing element 32 cooperates in a sealing manner with mutually opposing inner faces of the limbs 26, 28 constituting the second receiving portion 24.

As can be seen from FIG. 2, the dimensions of the first and second sealing elements 30, 32 are so selected that the first and second sealing elements 30, 32 do not completely fill the first and second receiving portions 18, 24 when the pipe connecting device 10 is connected to the pipeline portions 12, 14. Rather, the first and second sealing elements 30, 32 are arranged at a certain distance from the bridge portion 16 of the pipe connecting device 10, such that clearances 42, 44 are present between the first sealing element 30 and the bridge portion 16, and between the second sealing element 32 and the bridge portion 16.

In order to prevent the first sealing element 30, and thereby the edge portion 38 of the first pipeline portion 12, from slipping out of the first receiving portion 18 of the pipe connecting device 10, two mutually opposing securing projections 46, 48, which narrow a cross-section of the first receiving portion 18, are formed in the region of the first receiving portion 18. Similarly, two mutually opposing securing projections 50, 52, which narrow a cross-section of the second receiving portion 24 and which reliably prevent the second sealing element 32, and thereby the edge portion 40 of the second pipeline portion 14, from slipping out of the second receiving portion 24 of the pipe connecting device 10, are provided in the region of the second receiving portion 24.

Adjoining the first receiving portion 18 of the pipe connecting device 10 is a first extension portion 54, which is constituted by an elongation of the two limbs 20, 22 constituting the first receiving portion 18. Moreover, there is a second extension portion 56, which adjoins the second receiving portion 24 and which is constituted by an elongation of the two limbs 26, 28 constituting the second receiving portion 24. The extension portions 54, 56 advantageously protect against environmental influences the first and second sealing elements 30, 32 received in the first and second receiving portions 18, 24.

A vent bore 58 is formed in the region of the bridge portion 16 of the pipe connecting device 10, which connects an outer circumference of the pipe connecting device 10 to the first and second receiving portions 18, 24, i.e., to the clearances 42, 44 present between the bridge portion 16 and the sealing elements 30, 32. The vent bore 58 has the function of allowing the air that is enclosed between the receiving portions 18, 24 of the pipe connecting device 10 and the sealing elements 30, 32 to escape. Moreover, the vent bore 58 prevents the creation of a resistance caused by a vacuum in disassembly of the pipe connecting device 10.

Furthermore, a groove 60, which extends in the foil of a ring around the entire outer circumference of the pipe connecting device 10 and which serves to receive a fastening device such as, for example, a clamp fastener or the like, is formed on the outer circumference of the pipe connecting device 10. The connection point, constituted by the pipe connecting device 10, between the pipeline portions 12, 14 can thus be used simultaneously as a fastening point.

Finally, the pipe connecting device 10 has a further groove 62, which extends in the form of a ring along its entire inner circumference. As can be seen from FIG. 2, the further groove 62 serves to fasten a flow control device 64 for controlling the volume flow of fluid through the first and second pipeline portions 12, 14. In the exemplary embodiment shown in FIG. 2, the flow control device 64 is realized as a ring flow control device, and has four latching flanges 66 distributed along its circumference, which extend substantially perpendicularly relative to a flow control device face 68. The latching flanges 66 are each provided with a projection 70 which is latched into the further groove 62 formed on the inner circumference of the pipe connecting device 10, when the flow control device 64 is mounted to the pipe connecting device 10.

For the purpose of connecting the first and second pipeline portions 12, 14 by means of the pipe connecting device 10, the first sealing element 30 is first fitted onto the first pipeline portion 12 such that the edge portion 38 of the first pipeline portion 12 is received in the groove 34 formed in the first sealing element 30. Then, that component of the pipe connecting device 10 which is constituted by the bridge portion 16 and the two receiving portions 18, 24, and to which the flow control device 64 can be already fastened, is pushed over the edge portion 38 of the first pipeline portion 12, until the edge portion 38, with the first sealing element 30 fastened thereto, has been received in the first receiving portion 18. In the next step, the second sealing element 32 is fitted onto the edge portion 40 of the second pipeline portion 14, such that the edge portion 40 is received in the groove 36 formed in the second sealing element 32. Then, the edge portion 40 of the second pipeline portion 14, with the second sealing element 32 fastened thereto, is pushed into the second receiving portion 24, until the edge portion 40, with the second sealing element 32 fastened thereto, has been securely received in the second receiving portion 24.

Figure 3:
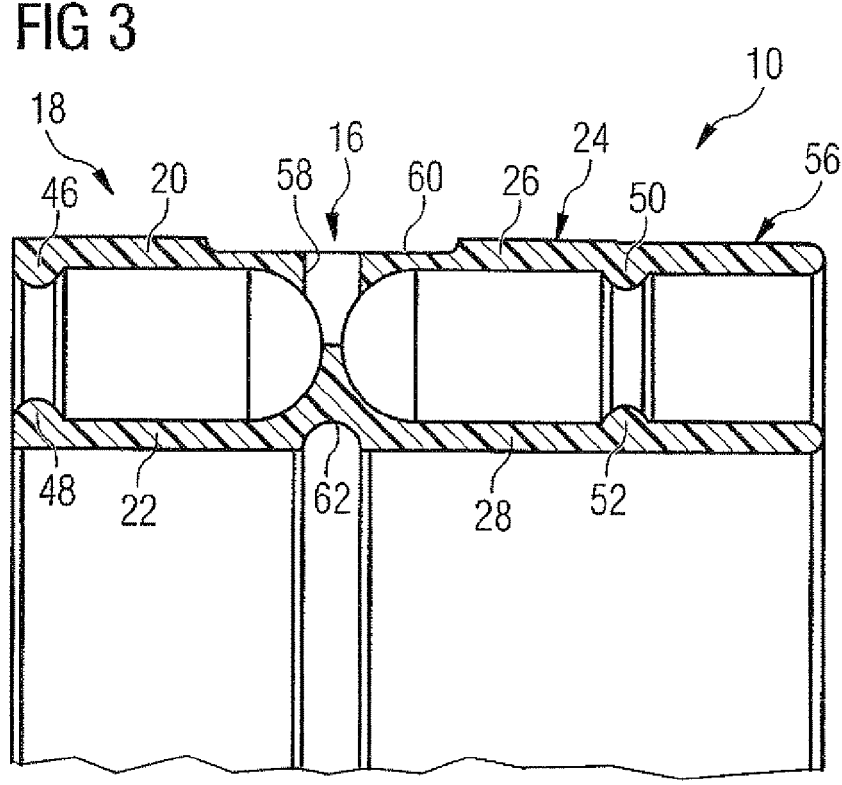
FIG. 3 shows, in longitudinal section, a second embodiment of a pipe connecting device according to the invention.
Figure 4:
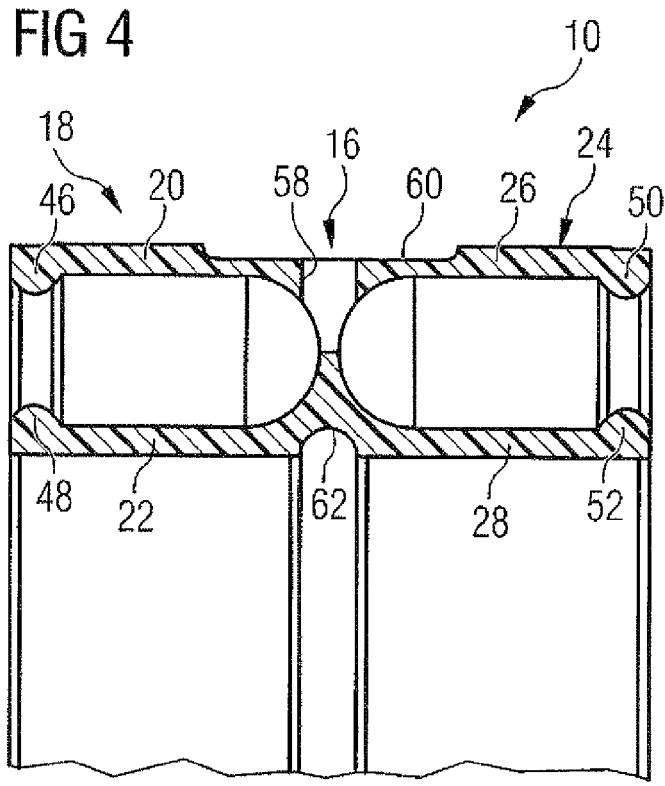
FIG. 4 shows, in longitudinal section, a third embodiment of a pipe connecting device according to the invention.

The embodiment of a pipe connecting device 10 shown in FIG. 3 differs from the device according to FIGS. 1 and 2 in that it has only one extension portion. Indeed, both extension portions are absent from the embodiment represented in FIG. 4. In other respects, the structure and functioning of the embodiments of a pipe connecting device 10 shown in FIGS. 3 and 4 correspond to the structure and functioning of the arrangement shown in FIGS. 1 and 2. The pipe connecting devices 10 having only one extension portion (FIG. 3) or without extension portions (FIG. 4) have the distinction of a particularly low weight.

The invention claimed is:

1. Pipe connecting device for connecting two pipeline portions of an aircraft pipeline system, comprising:
    a bridge portion having a cross-sectional form that matches a cross-sectional form of first and second pipeline portions that are to be connected to each other in the aircraft pipeline system,
    a first receiving portion, which is constituted by two limbs extending from the bridge portion in a first direction, and which is adapted to receive an edge portion of the first pipeline portion of the aircraft pipeline system,
    a second receiving portion, which is constituted by two limbs extending from the bridge portion in a second direction opposite to the first direction, and which is adapted to receive an edge portion of the second pipeline portion of the aircraft pipeline system,
    a first sealing element which, for the purpose of sealing the connection between the first pipeline portion and the pipe connecting device, is displaceably received in the first receiving portion when the pipe connecting device is connected to the first pipeline portion, and
    a second sealing element which, for the purpose of sealing the connection between the second pipeline portion and the pipe connecting device, is displaceably received in the second receiving portion when the pipe connecting device is connected to the second pipeline portion,
    wherein at an inner circumference the pipe connecting device is adapted to mount a flow control device, wherein the first sealing element is spaced from the bridge portion when the pipe connecting device is connected to the first pipeline portion, thereby defining a first clearance space between the first sealing element and the bridge portion.

2. Pipe connecting device according to claim 1, characterized in that a cross-sectional form of one of the first or the second sealing element is matched to the cross-sectional form of the pipeline portions that are to be connected to each other.

3. Pipe connecting device according to claim 1, characterized in that a groove, for receiving the edge portion of one of the first or the second pipeline portion, is formed in one of the first or the second sealing element.

4. Pipe connecting device according to claim 1, characterized in that two mutually opposing securing projections, which narrow a cross-section of one of the first or the second receiving portion, are formed in the region of one of the first or the second receiving portion.

5. Pipe connecting device according to claim 1, characterized by a first extension portion, which adjoins the first receiving portion and is constituted by an elongation of the limbs constituting the first receiving portion.

6. Pipe connecting device according to claim 5, characterized by a second extension portion, which adjoins the second receiving portion and is constituted by an elongation of the limbs constituting the second receiving portion.

7. Pipe connecting device according to claim 1, wherein the first and second pipeline portions are removably engaged with the first and second sealing elements, respectively, such that the first and second pipeline portions are spaced from each of the limbs of the first and second receiving portions.

8. Pipe connecting device for connecting two pipeline portions of an aircraft pipeline system, comprising:
    a bridge portion, the cross-sectional form of which is matched to a cross-sectional form of the pipeline portions that are to be connected to each other,
    a first receiving portion, which is constituted by two limbs extending from the bridge portion in a first direction, and which is adapted to receive an edge portion of a first pipeline portion of the aircraft pipeline system,
    a second receiving portion, which is constituted by two limbs extending from the bridge portion in a second direction opposite to the first direction, and which is adapted to receive an edge portion of a second pipeline portion of the aircraft pipeline system, and
    a vent bore, which connects an outer circumference of the pipe connecting device to the first and the second receiving portion,
    wherein at an inner circumference the pipe connecting device is adapted to mount a flow control device.

9. Pipe connecting device according to claim 8, further comprising:
    a first sealing element which, for the purpose of the sealing connection of the first pipeline portion to the pipe connecting device, is received in the first receiving portion of the pipe connecting device when the pipe connecting device is connected to the first pipeline portion, and
    a second sealing element which, for the purpose of the sealing connection of the second pipeline portion to the pipe connecting device, is received in the second receiving portion of the pipe connecting device when the pipe connecting device is connected to the second pipeline portion.

10. Pipe connecting device according to claim 9, wherein the first and second pipeline portions are removably engaged with the first and second sealing elements, respectively, such that the first and second pipeline portions are spaced from each of the limbs of the first and second receiving portions.

11. Pipe connecting device according to claim 9, characterized in that a cross-sectional form of one of the first or the second sealing element is matched to the cross-sectional form of the pipeline portions that are to be connected to each other.

12. Pipe connecting device according to claim 9, characterized in that a groove, for receiving the edge portion of one of the first or the second pipeline portion, is formed in one of the first or the second sealing element.

13. Pipe connecting device according to claim 8, characterized in that two mutually opposing securing projections, which narrow a cross-section of one of the first or the second receiving portion, are formed in the region of one of the first or the second receiving portion.

14. Pipe connecting device according to claim 8, characterized by a first extension portion, which adjoins the first receiving portion and is constituted by an elongation of the limbs constituting the first receiving portion.

15. Pipe connecting device according to claim 14, characterized by a second extension portion, which adjoins the second receiving portion and is constituted by an elongation of the limbs constituting the second receiving portion.

16. Pipe connecting device according to claim 8, characterized in that a groove, for receiving a fastening device, is formed on an outer circumference of the pipe connecting device.

17. Pipe connecting device according to claim 8, wherein the flow control device has at least one latching flange with a projection formed on the latching flange, which projection is adapted to cooperate with a further groove formed on the inner circumference of the pipe connecting device when the flow control device is mounted to the pipe connecting device.

18. Pipe connecting device for connecting two pipeline portions of an aircraft pipeline system, comprising:
   a bridge portion, the cross-sectional form of which is matched to a cross-sectional form of the pipeline portions that are to be connected to each other,
   a first receiving portion, which is constituted by two limbs extending from the bridge portion in a first direction, and which is adapted to receive an edge portion of a first pipeline portion of the aircraft pipeline system,
   a second receiving portion, which is constituted by two limbs extending from the bridge portion in a second direction opposite to the first direction, and which is adapted to receive an edge portion of a second pipeline portion of the aircraft pipeline system,
   a first sealing element which, for the purpose of the sealing connection of the first pipeline portion to the pipe connecting device, is displaceably received in the first receiving portion of the pipe connecting device when the pipe connecting device is connected to the first pipeline portion, and
   a second sealing element which, for the purpose of the sealing connection of the second pipeline portion to the pipe connecting device, is displaceably received in the second receiving portion of the pipe connecting device when the pipe connecting device is connected to the second pipeline portion,
   wherein at an inner circumference the pipe connecting device is adapted to mount a flow control device, and
   characterized in that a groove, for receiving a fastening device, is formed on an outer circumference of the pipe connecting device.

19. Pipe connecting device for connecting two pipeline portions of an aircraft pipeline system, comprising:
   a bridge portion, the cross-sectional form of which is matched to a cross-sectional form of the pipeline portions that are to be connected to each other,
   a first receiving portion, which is constituted by two limbs extending from the bridge portion in a first direction, and which is adapted to receive an edge portion of a first pipeline portion of the aircraft pipeline system,
   a second receiving portion, which is constituted by two limbs extending from the bridge portion in a second direction opposite to the first direction, and which is adapted to receive an edge portion of a second pipeline portion of the aircraft pipeline system,
   a first sealing element which, for the purpose of the sealing connection of the first pipeline portion to the pipe connecting device, is displaceably received in the first receiving portion of the pipe connecting device when the pipe connecting device is connected to the first pipeline portion, and
   a second sealing element which, for the purpose of the sealing connection of the second pipeline portion to the pipe connecting device, is displaceably received in the second receiving portion of the pipe connecting device when the pipe connecting device is connected to the second pipeline portion,
   wherein at an inner circumference the pipe connecting device is adapted to mount a flow control device, and
   wherein the flow control device has at least one latching flange with a projection formed on the latching flange, which projection is adapted to cooperate with a further groove formed on the inner circumference of the pipe connecting device when the flow control device is mounted to the pipe connecting device.

* * * * *